(12) United States Patent
Moller, Jr.

(10) Patent No.: US 7,507,362 B2
(45) Date of Patent: Mar. 24, 2009

(54) METHOD OF MAKING A MODULAR FLOOR TILE SYSTEM WITH TRANSITION EDGE

(76) Inventor: Jorgen J. Moller, Jr., 3043 E. Brighton Pl., Salt Lake City, UT (US) 84121

( * ) Notice: Subject to any disclaimer, the term of this patent is extended or adjusted under 35 U.S.C. 154(b) by 5 days.

(21) Appl. No.: 11/008,478

(22) Filed: Dec. 9, 2004

(65) Prior Publication Data

US 2006/0125153 A1   Jun. 15, 2006

(51) Int. Cl.
 *B29C 45/14* (2006.01)
(52) U.S. Cl. .................. 264/266; 264/247; 264/275; 425/129.1; 425/127
(58) Field of Classification Search .................. None
 See application file for complete search history.

(56) References Cited

U.S. PATENT DOCUMENTS

| 3,308,009 | A | * | 3/1967 | Baumgartner, Jr. | .......... 428/215 |
|---|---|---|---|---|---|
| 6,306,318 | B1 | * | 10/2001 | Ricciardelli et al. | ....... 264/37.32 |
| 6,607,627 | B2 | * | 8/2003 | Nelson | .......... 156/245 |
| 2002/0119291 | A1 | * | 8/2002 | Hainbach | ..................... 428/172 |
| 2002/0189183 | A1 | * | 12/2002 | Ricciardelli | ................... 52/390 |
| 2005/0200051 | A1 | * | 9/2005 | Ricciardelli et al. | ......... 264/511 |

FOREIGN PATENT DOCUMENTS

JP   57-25930   * 2/1982

* cited by examiner

*Primary Examiner*—Edmund H. Lee
(74) *Attorney, Agent, or Firm*—Holland & Hart

(57) ABSTRACT

The present invention provides a method of making modular floor tiles. The method includes adding a protective layer to a modular floor tile, which may provide surface protection, a high gloss finish, or other advantageous features. The protective layer may comprise a polymer sheet that is melded to a top surface of the modular floor tile.

11 Claims, 2 Drawing Sheets

METHOD OF MAKING A MODULAR FLOOR TILE SYSTEM WITH TRANSITION EDGE

TECHNICAL FIELD

This invention relates generally to floor tiles, and more particularly to modular floor systems with a protective top layer.

BACKGROUND OF THE INVENTION

Floor tiles have traditionally been used for many different purposes, including both aesthetic and utilitarian purposes. For example, floor tiles of a particular color may be used to accentuate an object displayed on top of the tiles. Alternatively, floor tiles may be used to simply protect the surface beneath the tiles from various forms of damage. Floor tiles typically comprise individual panels that are placed on the ground either permanently or temporarily depending on the application. A permanent application may involve adhering the tiles to the floor in some way, whereas a temporary application would simply involve setting the tiles on the floor. Some floor tiles can be interconnected to one another to cover large floor areas such as a garage, an office, or a show floor.

Various interconnection systems have been utilized to connect floor tiles horizontally with one another to maintain structural integrity and provide a desirable, unified appearance. In addition, floor tiles can be manufactured in many shapes, colors, and patterns. Some floor tiles contain holes such that fluid and small debris is able to pass through the floor tiles and onto a surface below. Tiles can also be equipped with special surface patterns or structures to provide various superficial or useful characteristics. For example, a diamond steel pattern may be used to provide increased surface traction on the tiles and to provide a desirable aesthetic appearance.

One method of making plastic floor tiles utilizes an injection molding process. Injection molding involves injecting heated liquid plastic into a mold. The mold is shaped to provide an enclosed space to form the desired shaped floor tile. The liquid plastic is allowed to cool and solidify, and the plastic floor tile is removed from the mold.

A top surface of typical modular tile floors generally comprises the same material as the rest of the tile. However, the top surface is often scuffed, scratched, or otherwise damaged and dulled as the modular floor is used. Some have added paint coatings to modular tile floors in the past, but the paint coatings are not durable. Paint coatings are easily scratched and damaged. There is a need for a protective layer that better protects modular flooring systems.

The present invention is directed to overcoming, or at least reducing the effect of, one or more of the problems presented above.

SUMMARY OF EMBODIMENTS OF THE INVENTION

In one of many possible aspects, the present invention provides a method of making modular floor panels. The method comprises providing a mold, opening the mold, inserting a protective sheet into the mold, closing the mold, and injecting a liquid polymer into the mold. The method may include holding the protective sheet adjacent to a top plate of the mold prior to closing the mold. The protective sheet may be held by electrically charging it prior to inserting it into the mold. The method may also include bonding the protective sheet across a top surface of the liquid polymer or forming the protective sheet across the top surface of the liquid polymer in a pattern of the mold. According to some aspects of the invention, the protective sheet is a high gloss polymer sheet, which may be approximately 3-5 mm thick. The inserting of the protective sheet into the mold may be done robotically. The method may also include ejecting the modular floor panel and protective sheet from the mold as a single piece.

Another aspect of the invention also provides a method of making modular floor panels. The method includes providing a substantially transparent co-polymer sheet, picking up the transparent co-polymer sheet with a robotic arm, inserting the transparent co-polymer sheet into a floor panel mold, closing the floor panel mold, injecting a second co-polymer material into the mold, and melding the transparent co-polymer sheet to the second co-polymer material. The method may include electrically charging the transparent co-polymer sheet. The transparent co-polymer sheet may be approximately 3-5 mm thick. Moreover, a top surface of the second co-polymer and the co-polymer sheet may be formed into a surface pattern.

Another aspect of the invention provides a modular floor tile. The modular floor tile comprises an injection molded panel including a top surface and a plurality of lateral edge connectors, and a protective polymer layer disposed across the top surface. According to some embodiments the protective polymer layer is not paint, nor is it a sprayable or spreadable coating. Instead, the protective polymer layer is preferably a sheet of material. The modular floor tile and the protective polymer layer may comprise co-polymers. The top surface and the protective polymer layer may be molded into a single top surface pattern. The protective polymer layer may be a high gloss, substantially clear layer.

The foregoing features and advantages, together with other features and advantages of the present invention, will become more apparent when referring to the following specification, claims and accompanying drawings.

BRIEF DESCRIPTION OF THE DRAWINGS

The accompanying drawings illustrate various embodiments of the present invention and are a part of the specification. The illustrated embodiments are merely examples of the present invention and do not limit the scope of the invention.

Throughout the drawings, identical reference numbers designate similar, but not necessarily identical, elements.

DETAILED DESCRIPTION OF THE INVENTION

As mentioned above, typical modular flooring is easily damaged by scratches and scuffs. The look and life of modular flooring are often significantly compromised due to the direct exposure of the top surface to the elements, pedestrian and other traffic, and any objects that may be placed thereon. The present invention describes methods and apparatus that provide a protective layer over a top surface of a modular floor panel. Consequently, modular flooring made according to principles of the present invention may be more durable and aesthetically pleasing than prior modular flooring systems. The methods and systems shown and described below include specific modular flooring embodiments which including a protective layer. However, the application of the principles described herein is not limited to the specific devices shown. The principles described herein may be used with any flooring system. Therefore, while the description below is directed primarily to interlocking plastic modular floors, the methods and apparatus are only limited by the appended claims.

As used throughout the claims and specification, the term "modular" refers to objects of regular or standardized units or dimensions, as to provide multiple components for assembly of flexible arrangements and uses. The words "including" and "having," as used in the specification, including the claims, have the same meaning as the word "comprising."

Figure 1:
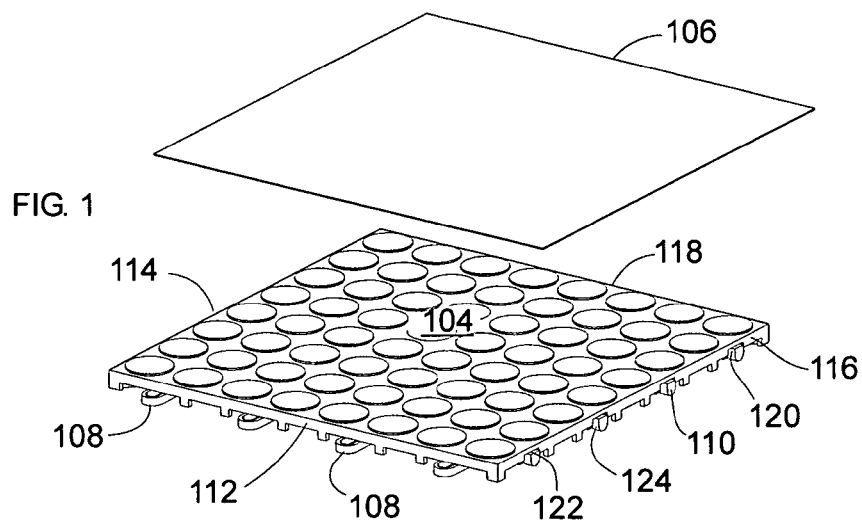
FIG. 1 is a perspective assembly view of a modular floor panel and a protective sheet according to one embodiment of the present invention.

Referring now to the drawings, and in particular to FIG. 1, an assembly view of a modular floor panel 100 according to principles of the present invention is shown. The modular floor panel 100 shown in FIG. 1 includes an injection molded tile or panel 102 with a top surface 104 and a protective sheet of material such a co-polymer layer 106 adapted to be disposed across the top surface 104. The injection molded tile 102 comprises a plurality of lateral edge connecting members. According to the embodiment of FIG. 1, the plurality lateral edge connecting members comprise a plurality of female tabs 108 arranged on two adjacent sides 112, 114 of the rectangular injection molded tile 102, and a plurality of male tabs 110 arranged on another two adjacent sides 116, 118 of the molded tile 102. The female tabs 108 are receptive of male tabs of another injection molded tile 102 to modularly create a floor.

The male tabs 110 include a generally vertical component which, according to the embodiment of FIG. 1, comprises a semi-circular post 120. The male tabs 110 also comprise generally horizontal components which, according to the embodiment of FIG. 1, comprise semi-circular discs 122. A curved portion 124 of the semi-circular discs 122 face the floor or ground. The semi-circular discs 122 are received through the looping female tabs 108, and extend at least partially under an adjacent injection molded tile to removably secure multiple tiles to one another. The semi-circular posts 120 and the semi-circular disc 122 are rigid, but compressible toward one another. When inserted into the female tabs 108, the semi-circular posts 120 and the semi-circular discs 122 maintain a constant pressure against the female tabs 108, thereby securing a connection between desired components (e.g. between two or more adjacent injection molded tiles 102). The connection members engage one another such that the different components are joined tightly to one another and provide a consistent upper surface. The injection molded tile 102 is preferably made of a co-polymer material.

The co-polymer layer 106 is also preferably made of a polymer or co-polymer, which may be a high gloss, substantially clear or transparent sheet. The co-polymer layer 106 is a separate component from the injection molded tile 102, and is not a spray coating such as paint. The co-polymer layer 106 is substantially the same size as the top surface 104 of the injection molded tile 102 as shown in FIG. 1. The co-polymer layer 106 is preferably substantially flat as shown in FIG. 1, prior to being formed or melded across the top surface 104.

Figure 2A:
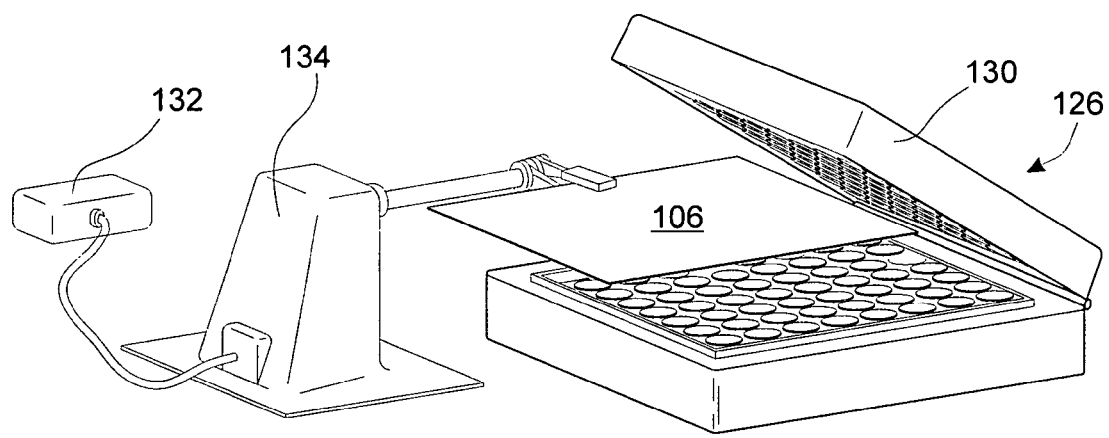
FIG. 2A is a perspective view of a modular floor panel mold and an associated robotic arm inserting the protective sheet into the mold according to one embodiment of the present invention.
Figure 2B:
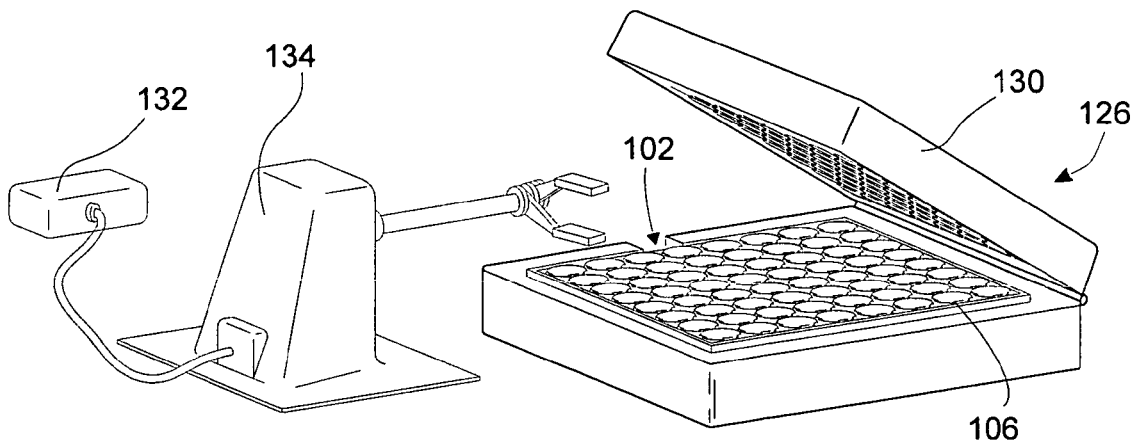
FIG. 2B is a perspective view of the modular floor panel mold of FIG. 2A after injection molding the floor panel and bonding the protective sheet to the floor panel.

The modular floor panel 100 is preferably made with the use of a mold. Referring to FIG. 2A, a mold 126 is shown in accordance with one embodiment of the present invention. The mold 126 is shown open and includes an injection cavity 128 and a top plate such as a lid 130. The lid 130 includes an internal pattern 131 that will be formed into the top surface 104 (FIG. 1) of the molded tile 102 and the co-polymer layer 106.

According to some embodiments, the co-polymer layer 106 is electrically or statically charged, for example by a charger 132. Alternatively, the co-polymer layer 106 could be mechanically placed in the mold 126 by arm 132, and mechanically coupled to the lid 130. A robotic arm 132 places the charged co-polymer layer in the mold 126. The co-polymer layer is attracted to the lid 130, which holds the co-polymer layer 106 adjacent thereto when the mold 126 is open. The lid 130 of the mold 126 is then closed, and a volume of liquid plastic, preferably a second co-polymer, is injected into the cavity 128. The injected co-polymer is preferably opaque, as opposed to the clear co-polymer layer 106. The injected co-polymer conforms to the shape of the cavity 128 and the inner surface pattern 131 of the lid 130. In addition, the high temperature of the injected co-polymer or the lid 130 softens or melts the co-polymer layer 106, which also conforms to the shape of the inner surface of the lid 130. The co-polymer layer 106 bonds or melds to the liquid plastic of the molded tile 102 (FIG. 1), and the liquid plastic is allowed to cool and solidify. As the liquid plastic solidifies, the copolymer layer 106 and molded tile 102 (FIG. 1) form a single piece, which is ejected from the mold 126.

Figure 3B:
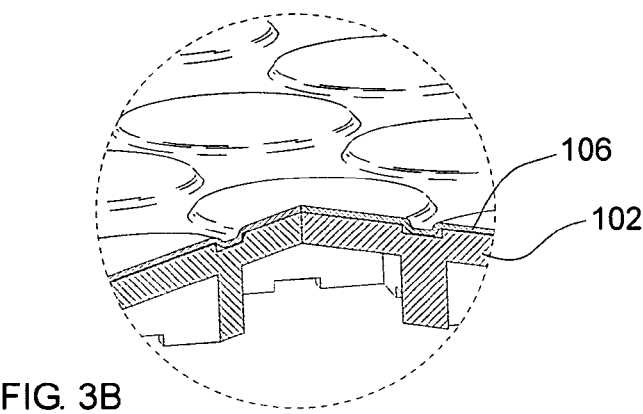
FIG. 3B is a magnified view of a portion of the illustration shown in FIG. 3A.
Figure 3A:
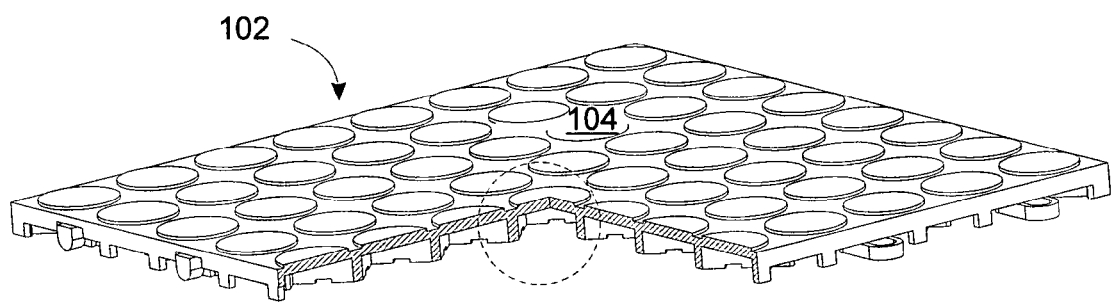
FIG. 3A is a perspective view, partly in section, of a completed modular floor panel with a protective layer made according to one aspect of the present invention.
Figure 4B:
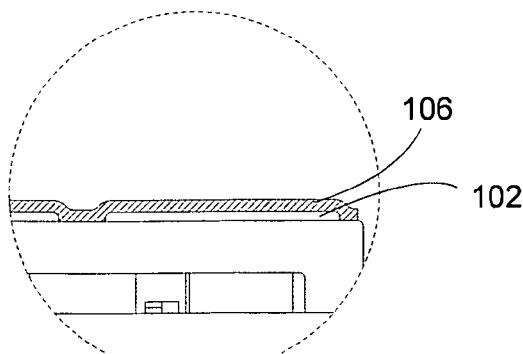
FIG. 4B is a magnified view of a portion of the side view shown in FIG. 4A.
Figure 4A:
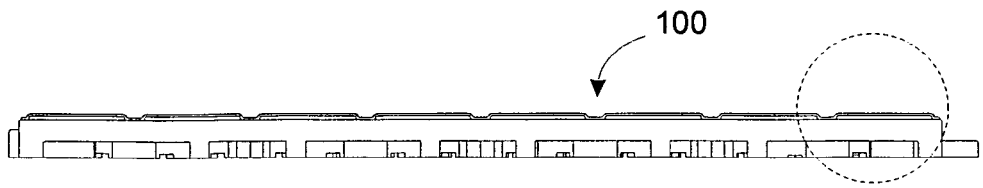
FIG. 4A is a side view of the completed modular floor panel of FIG. 3A.

The completed modular floor panel 100 is shown in FIGS. 3A-3B following ejection from the mold 126. The modular floor panel 100 is thus layered with the co-polymer layer 106 disposed across the molded tile 102. The co-polymer layer 106 may be approximately 1-7 mm thick, preferably about 3-5 mm thick. The partial sectional view of the completed modular floor panel 100 in FIGS. 3A-3B illustrates the co-polymer layer 106 conforming to the same shape as the top surface 104 of the molded tile 102. In addition, as shown in FIGS. 4A-4B, the co-polymer layer 106 preferably extends along the entire top surface 104 (FIG. 3A). Many modular floor panels 100 may be made according to the same or similar processes, and each modular floor panel 100 may be interconnected with one or more other modular floor panels to create a floor of any size and shape. Thus, a modular floor with a protective, high gloss coating may be made according to principles of the present invention.

The preceding description has been presented only to illustrate and describe exemplary embodiments of invention. It is not intended to be exhaustive or to limit the invention to any precise form disclosed. Many modifications and variations are possible in light of the above teaching. It is intended that the scope of the invention be defined by the following claims.

The invention claimed is:

1. A method of making modular floor panels, comprising:
   providing a mold, the mold having an injection cavity defined by a first mold half and a second mold half, the first mold half having surface cavities that create a surface pattern for a modular floor panel;
   opening the mold;
   inserting a protective sheet into the mold adjacent the first mold half prior to closing the mold, wherein the protective sheet is substantially the same size as the top surface of the modular floor panel volume;
   closing the mold;
   injecting a liquid polymer into the mold such that the liquid polymer softens the protective sheet;

forming the protective sheet in a pattern of the mold such that the protective sheet conforms to the surface cavities in the first mold half;

wherein the liquid polymer bonds to the protective sheet.

2. A method of making modular floor panels according to claim 1, further comprising bonding the protective sheet across a top surface of the liquid polymer.

3. A method of making modular floor panels according to claim 1, wherein inserting a protective sheet into the mold comprises providing a high gloss polymer sheet.

4. A method of making modular floor panels according to claim 1, wherein the inserting a protective sheet into the mold comprises providing a high gloss polymer sheet of approximately 3-5 mm in thickness.

5. A method of making modular floor panels according to claim 1, wherein the inserting a protective sheet into the mold comprises robotically placing the protective sheet into the mold.

6. A method of making modular floor panels according to claim 1, further comprising ejecting the modular floor panel and protective sheet from the mold as a single piece.

7. A method of making modular floor panels according to claim 1, further comprising forming the liquid polymer into a floor tile comprising a plurality of lateral edge connectors.

8. A method of making modular floor panels, comprising:

providing a substantially transparent co-polymer sheet comprising a first copolymer material;

picking up the transparent co-polymer sheet with a robotic arm;

inserting the transparent co-polymer sheet into a floor panel mold, the mold having an injection cavity defined by a first mold half and a second mold half which combine to form a cavity defining a generally rectangular modular floor panel with a top surface pattern;

placing the transparent co-polymer sheet adjacent to the first mold cavity, wherein the transparent co-polymer sheet is substantially the same size as the generally rectangular modular floor panel;

closing the floor panel mold;

injecting a second co-polymer material into the mold to soften the first co-polymer material, to cause the second co-polymer material and the first co-polymer material to conform to the top surface pattern, and to bond the second co-polymer material to the first co-polymer material;

wherein a top surface of the second co-polymer and the transparent co-polymer sheet are formed into a surface pattern.

9. A method of making modular floor panels according to claim 8, further comprising shaping the transparent co-polymer sheet and the second co-polymer into a modular floor tile.

10. A method of making modular floor panels according to claim 8, wherein providing a transparent co-polymer sheet comprises providing a sheet approximately 3-5 mm in thickness.

11. A method of making modular floor panels according to claim 1, wherein the floor panel comprises an interlocking modular floor tile.

* * * * *